(12) United States Patent
Heshash

(10) Patent No.: US 9,913,485 B2
(45) Date of Patent: Mar. 13, 2018

(54) LOLLIPOP

(71) Applicant: Ohad Heshash, Yavne (IL)

(72) Inventor: Ohad Heshash, Yavne (IL)

(*) Notice: Subject to any disclaimer, the term of this patent is extended or adjusted under 35 U.S.C. 154(b) by 0 days.

(21) Appl. No.: 15/194,579

(22) Filed: Jun. 28, 2016

(65) Prior Publication Data

US 2017/0188599 A1 Jul. 6, 2017

(30) Foreign Application Priority Data

Dec. 31, 2015 (IL) .......................... 243440

(51) Int. Cl.
*A23G 3/56* (2006.01)
*B65D 65/02* (2006.01)
*B65D 75/54* (2006.01)
*A23G 7/00* (2006.01)
*B65D 75/58* (2006.01)

(52) U.S. Cl.
CPC ........... *A23G 3/563* (2013.01); *A23G 7/0012* (2013.01); *B65D 75/58* (2013.01)

(58) Field of Classification Search
CPC .......... A23G 9/50; A23G 9/503; A23G 9/506; A23G 7/0012; A23G 7/0018; A23G 3/56; A23G 3/563; A23G 3/566; A23G 4/184; A23G 4/186; A23G 4/188; A23G 2220/10; A23G 2220/12; B65D 75/54; B65D 75/70; B65D 1/02; B65D 77/28; B65D 75/58; B65D 65/02; A47G 2400/06; B65C 77/28; B65B 11/00; B65B 11/54; B65B 25/00; B65B 25/005; B65B 25/006
USPC .... 426/90, 91, 104, 134, 132; 81/3.07, 3.29; 424/440; D1/102, 103, 104, 105, 127
See application file for complete search history.

(56) References Cited

U.S. PATENT DOCUMENTS 2,276,476 A * 3/1942 Folger ........................ B67B 7/44
30/1.5
3,203,087 A * 8/1965 Jahn ........................... B67B 7/34
30/1.5
3,615,596 A * 10/1971 Petti ........................ B43K 29/00
401/34

(Continued)

FOREIGN PATENT DOCUMENTS

EP 0787657 A1 * 8/1997 ............. B65D 75/70
GB 1362764 A * 8/1974 ............. A23G 3/563
KR 20120131343 A * 12/2012

OTHER PUBLICATIONS

Sickle Definition. Merriam Webster Online Dictionary. Apr. 22, 2009. Retrieved from Internet URL: <https://web.archive.org/web/20090422170108/http://www.merriam-webster.com/dictionary/sickle>.*

(Continued)

*Primary Examiner* — Erik Kashnikow
*Assistant Examiner* — Ashley Axtell
(74) *Attorney, Agent, or Firm* — Edward Langer ADV & Patent Attorney

(57) ABSTRACT

The present invention is directed to a lollipop (10) comprising: a hollowed stick (14); a sweetmeat (12) mounted on one end of the hollowed stick (14); a cover (16) in a form of a sheet folded around both, the sweetmeat (12) and the stick (14); and a lollipop cover cutter (20), comprising: a handle (24) mating with the hollowed stick (14); and a sickle (22) connected to the handle (24); thereby upon locating the stick (14) in the sickle (22) and rotating the stick (14), cutting the cover (16) by the blade (26).

6 Claims, 7 Drawing Sheets

(56) References Cited

U.S. PATENT DOCUMENTS

| | | | | |
|---|---|---|---|---|
| 3,862,591 A * | 1/1975 | Cottrell | ................... | B31C 5/00 |
| | | | | 242/DIG. 3 |
| 5,878,497 A * | 3/1999 | Seemann, III | ........ | B67B 7/0441 |
| | | | | 30/1.5 |
| 6,886,253 B2 * | 5/2005 | Chan | ...................... | B67B 7/30 |
| | | | | 30/1.5 |

OTHER PUBLICATIONS

The Canadian Patent Office Record, The Office 1905. vol. 33, p. 581. Left col. Retrieved from Internet URL: <https://books.google.com/books?id=BIg6AQAAMAAJ&dq=flexible+blade+razor+canadian&source=gbs_navlinks_s>.*
KR 20120131343 KIPRIS Translation.*

* cited by examiner

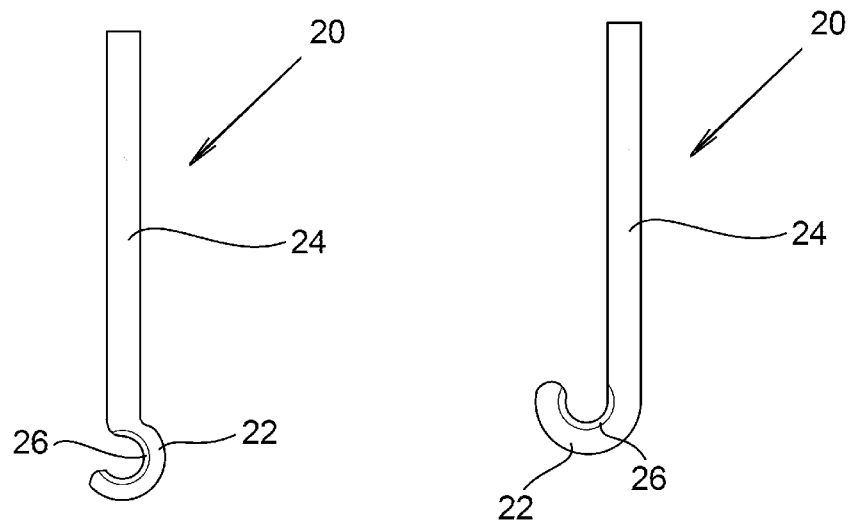
Fig.4a  Fig.4b
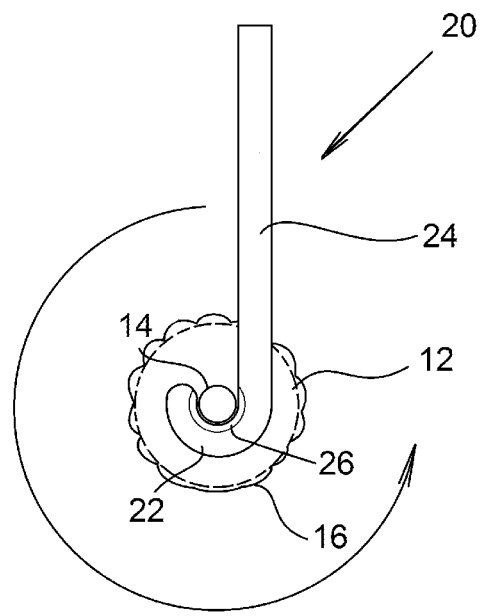
Fig. 5

LOLLIPOP

TECHNICAL FIELD

The present invention relates to the field of sweets. More particularly, the invention relates to a lollipop.

BACKGROUND ART

A lollipop is a type of confectionery consisting of a sweetmeat of hard candy or water-ice mounted on a stick and intended for sucking or licking. Different informal terms are used in different places, including lolly, sucker, sticky-pop, etc. (from Wikipedia)

In order to keep a lollipop in hygiene condition, it is common to cover the lollipop by cellophane of paper cover.

FIG. 1 schematically illustrates a lollipop, according to the prior art.

The lollipop, which is marked herein by reference numeral 10, comprises a sweetmeat 12 mounted on stick 14 and enveloped by a cover 16 made of cellophane, wax paper and the like. The cover envelops also the stick at the area where the sweetmeat and the stick meet. This part is marked herein by reference numeral 28. The cover is tied up at this area in order to prevent unintentional removing thereof.

In order to remove the envelope from the lollipop, the user rips the cover at area 28. This action affects the enjoyment of using the lollipop as the tearing is not carried out in an "easy" manner.

FIG. 2 schematically illustrates another example of a lollipop, according to the prior art.

In this case, a knot 18 is tied to the stick at the side 28 where the stick meets with the sweetmeat 12.

The example of FIG. 2 is an attempt to provide a convenient solution for removing a lollipop cover, as the knot 18 replaces the glue or other means for keeping the cover closed.

Each of the dashed lines denotes a hidden contour of an object.

All the methods described above have not yet provided satisfactory solutions to the problem of removing a lollipop cover.

It is an object of the present invention to provide a solution to the above-mentioned and other problems of the prior art.

Other objects and advantages of the invention will become apparent as the description proceeds.

SUMMARY OF THE INVENTION

The present invention is directed to a lollipop (10) comprising: a hollowed stick (14); a sweetmeat (12) mounted on one end of the hollowed stick (14); a cover (16) in a form of a sheet folded around both, the sweetmeat (12) and the stick (14); and a lollipop cover cutter (20), comprising: a handle (24) mating with the hollowed stick (14); and a sickle (22) connected to the handle (24); thereby upon locating the cover (16) into the sickle (22) and rotating the stick (14), the cover (16) is cut by the blade (26).

Preferably, an inner diameter of the blade (26) is greater than an outer diameter of the stick (14).

Preferably, a section of the blade is greater than 180 degrees, thereby upon placing the stick in the inner side of the blade, locking the stick in the inner side of the blade, thereby obviating a need to apply force of the stick against the blade.

Preferably, said cutter (20) is made of one piece, thereby manufacturing thereof by casting.

Preferably, the sickle is flexible, thereby allowing increasing its diameter to suit to a diameter of the stick.

Preferably, the sickle is made of plastic, thereby decreasing a chance of a user thereof to injure himself.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF DRAWINGS

Preferred embodiments, features, aspects and advantages of the present invention are described herein in conjunction with the following drawings:

FIG. 4a schematically illustrates a lollipop cutter 20, according to one embodiment of the invention.

FIG. 4b schematically illustrates a lollipop cutter 20, according to another embodiment of the invention.

FIG. 5 is a bottom view of a lollipop 10, during an operation of cutting the envelope, according to one embodiment of the invention.

FIG. 8a is a side view of cutter 20, according to one embodiment of the invention. In the figure is defined a cross section A-A. FIG. 8b is the cross section A-A defined in FIG. 8a.

It should be understood that the drawings are not necessarily drawn to scale.

DESCRIPTION OF EMBODIMENTS

The present invention will be understood from the following detailed description of preferred embodiments ("best mode"), which are meant to be descriptive and not limiting. For the sake of brevity, some well-known features, methods, systems, procedures, components, and so on, are not described in detail.

Figure 1:
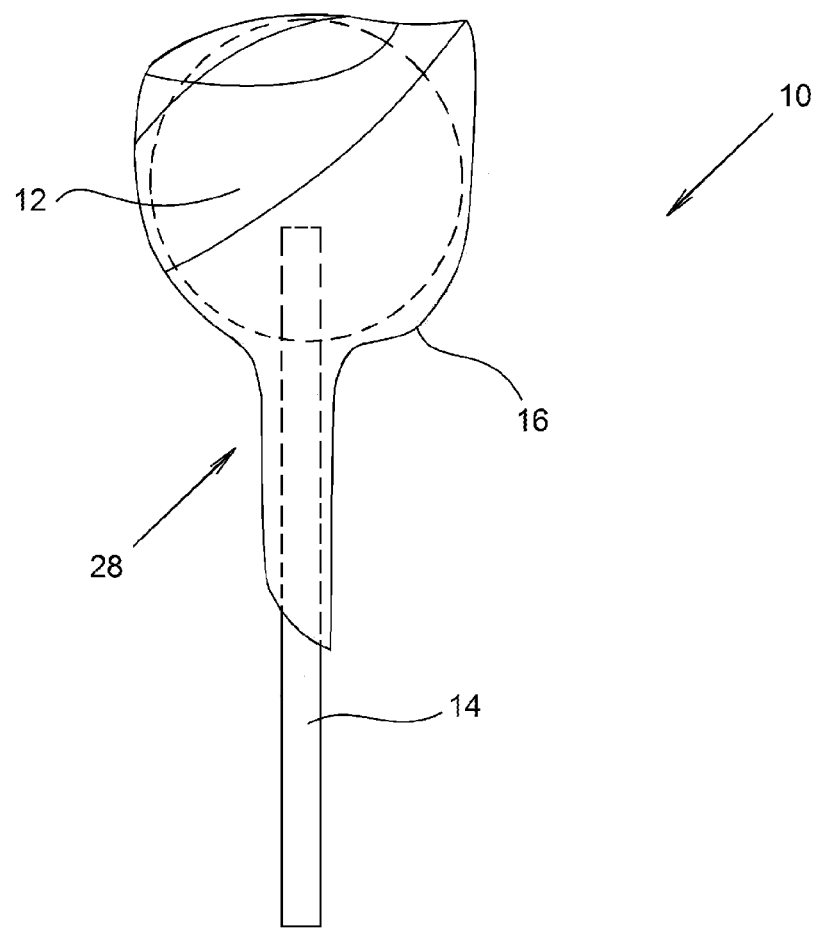
FIG. 1 schematically illustrates a lollipop, according to the prior art.
Figure 2:
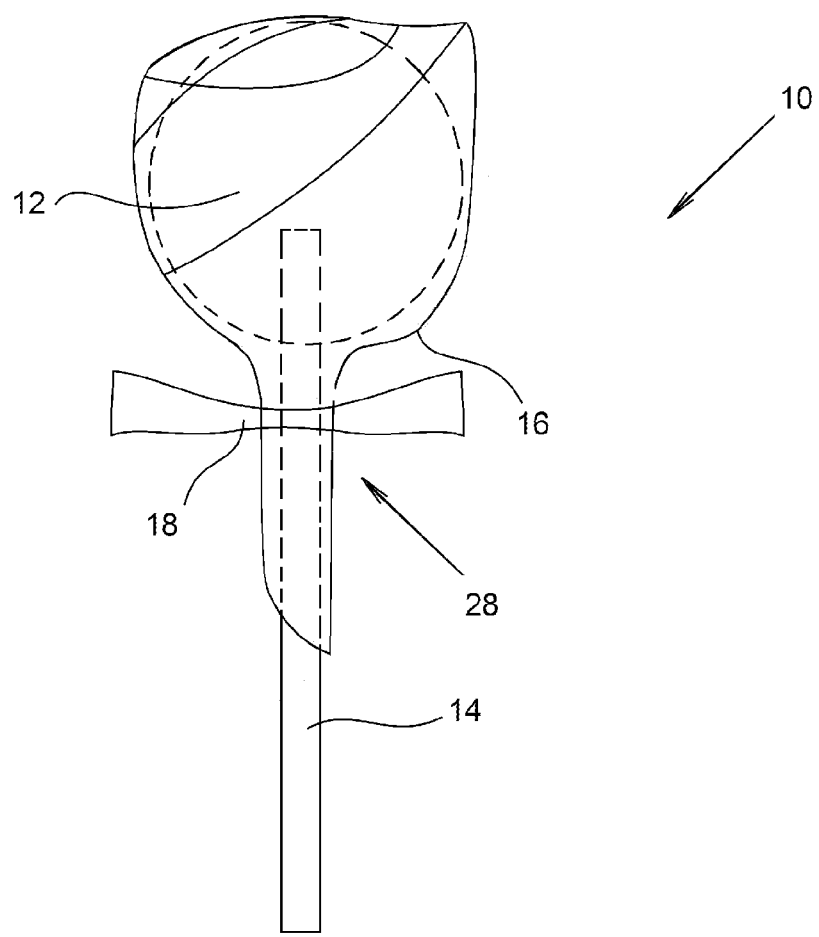
FIG. 2 schematically illustrates another example of a lollipop, according to the prior art.
Figure 3:
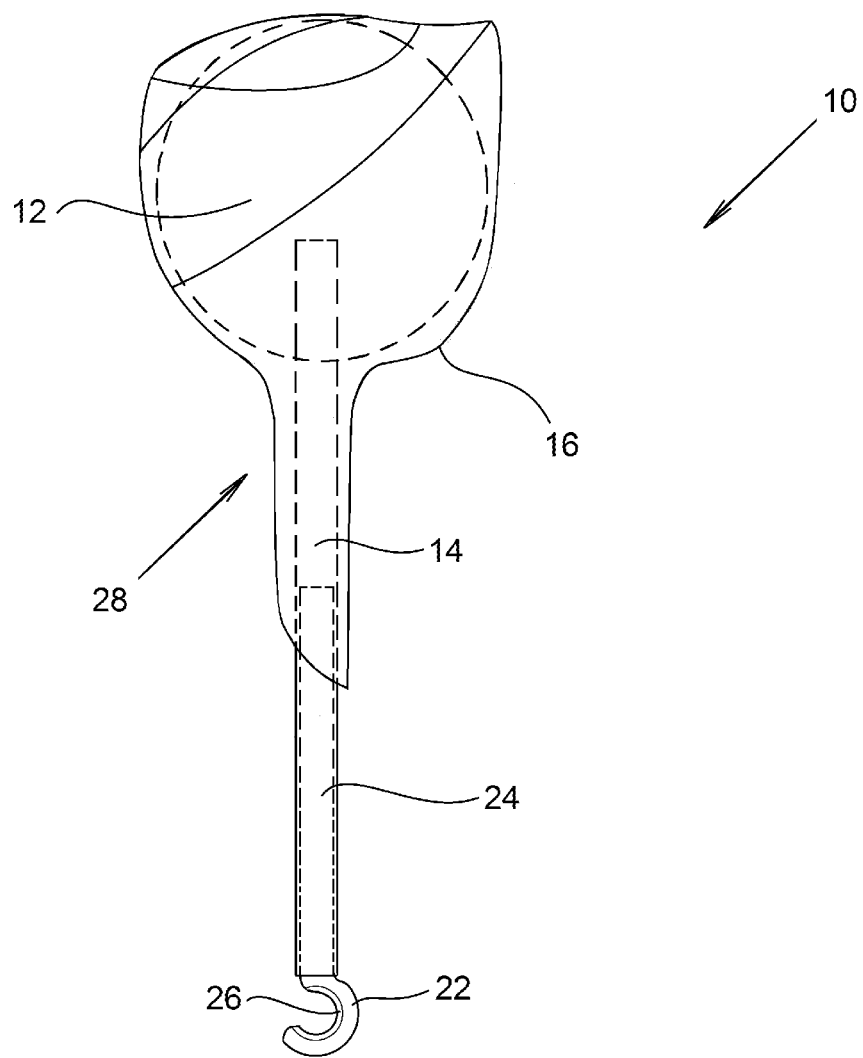
FIG. 3 schematically illustrates a lollipop, according to one embodiment of the invention.

FIG. 3 schematically illustrates a lollipop, according to one embodiment of the invention.

The lollipop 10 comprises a sweetmeat 12 mounted on a hollowed stick 14, and enveloped by cover 16 in a form of a folded sheet made of, for example, waxed paper or cellophane.

The lollipop differs from the prior art by the use of a cutter. The cutter comprises a handle 24, wherein at one end thereof is connected a sickle 22. Numeral 26 denotes a blade of sickle 22.

The cutter is stored in lollipop 10 by mating with the hollowed stick 14. More particularly, the outer diameter of handle 24 is about the inner diameter of the hollowed stick 14, thereby providing some friction which prevents unintentional separation of the cutter from the stick.

FIG. 4a schematically illustrates a lollipop cutter 20, according to one embodiment of the invention.

According to this embodiment of the invention, the sickle is a form of a hook.

FIG. 4b schematically illustrates a lollipop cutter 20, according to another embodiment of the invention.

According to this embodiment of the invention, the sickle is in a form of an umbrella stick.

Figure 6:
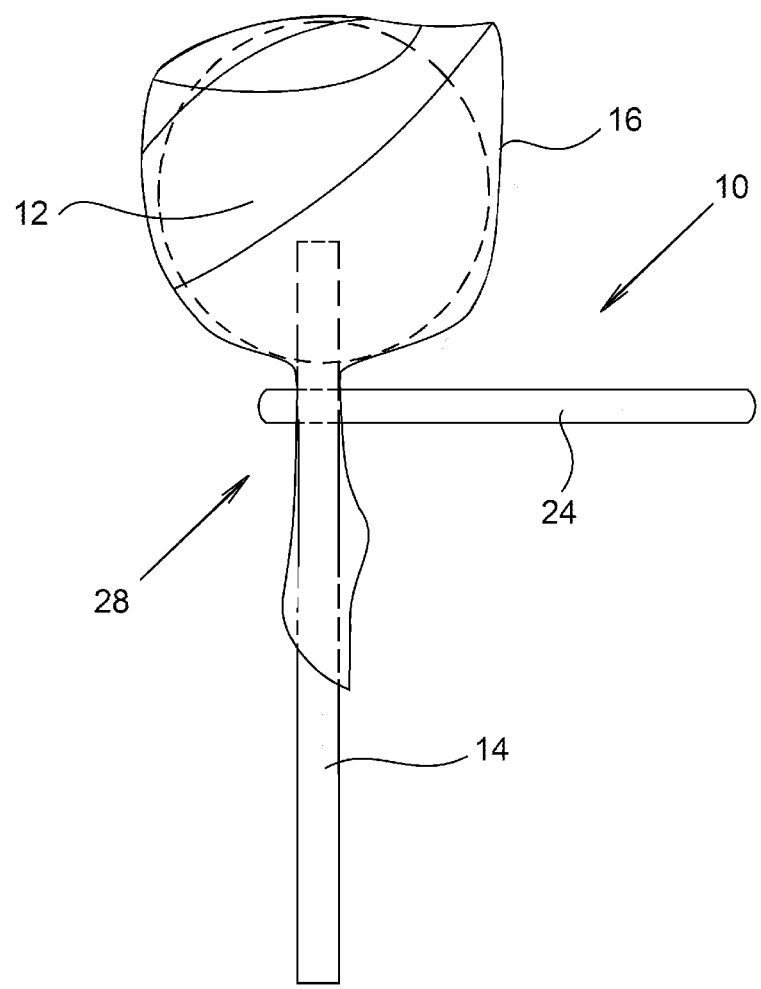
FIG. 6 is a side view thereof.

FIG. 5 is a bottom view of a lollipop 10, during an operation of cutting the envelope, according to one embodiment of the invention. FIG. 6 is a side view thereof.

After pulling the cutter 20 from the handle 24 of the hollowed lollipop stick (not illustrated), a user holds the handle 24 by the fingers of one hand, and places the lollipop stick 14 in the center of the sickle of the cutter, at area 28 which is under the sweetmeat. In this situation he rotates the stick 14 or the handle 24, thereby cutting the cover 16. Then he pulls the cover (illustrated in FIG. 7) thereby exposing the sweetmeat.

Figure 7:
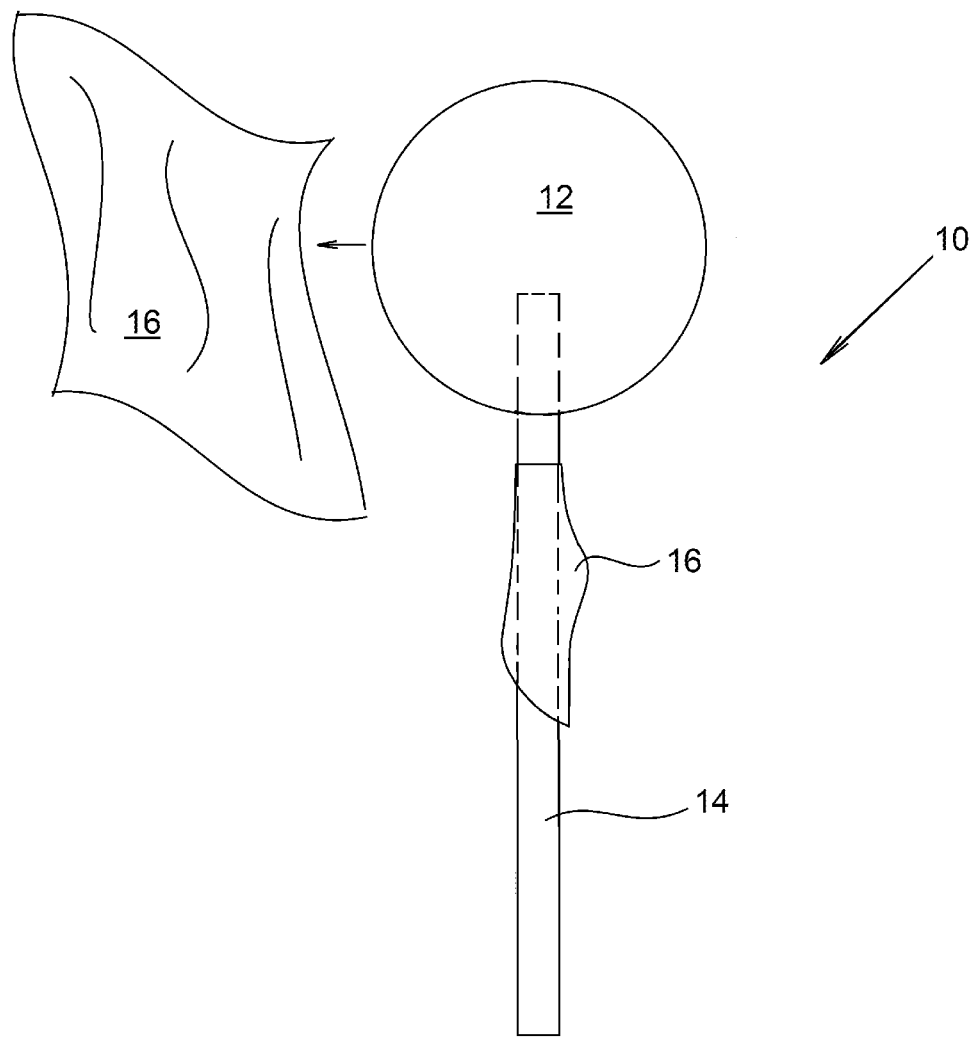
FIG. 7 illustrates an operation of removing the cover from a lollipop, according to one embodiment of the invention.

In FIGS. 5 to 7 the user hand is not illustrated.

Figures 8A, 8B:
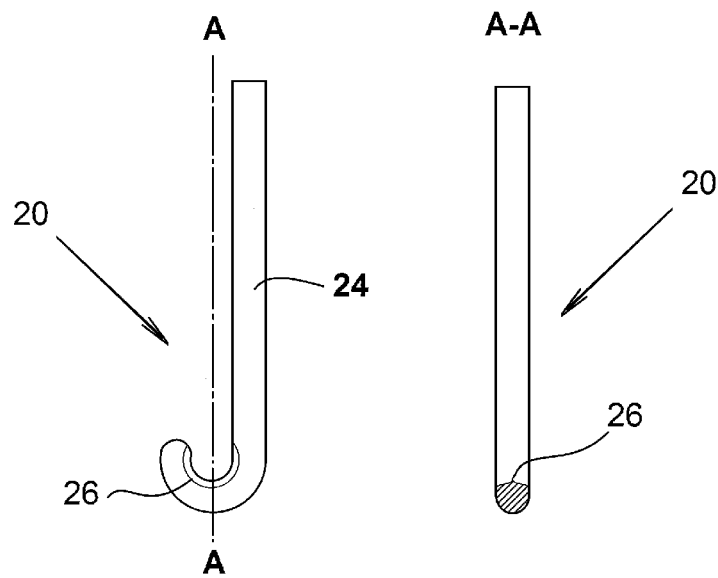

FIG. 8a is a side view of cutter 20, according to one embodiment of the invention. In the figure is defined a cross section A-A. FIG. 8b is the cross section A-A defined in FIG. 8a.

The purpose of these figures is to illustrate the blade 26.

Figure 9:
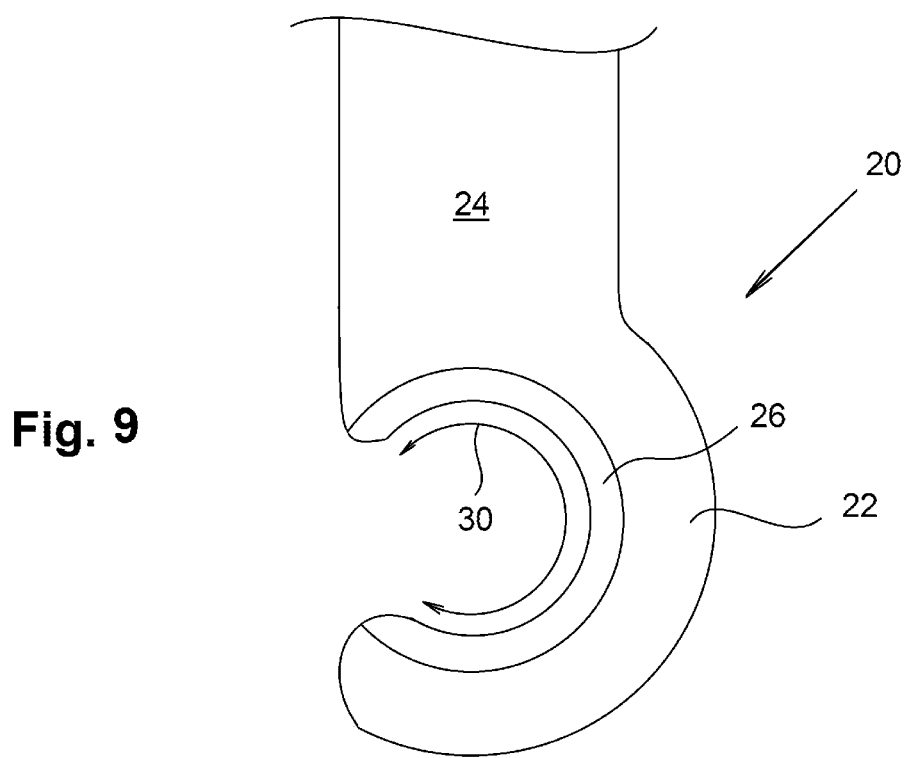
FIG. 9 is a zoomed view on a cutter 20, according to one embodiment of the invention.

FIG. 9 is a zoomed view on a cutter 20, according to one embodiment of the invention.

As illustrated, the section 30 of the sickle is greater than 180 degrees. Thus, when a lollipop stick is placed in the inner side of the sickle, it is slightly locked, thereby obviating a need to apply force of the stick against the blade, but merely performing the rotation.

In the figures and/or description herein, the following reference numerals (Reference Signs List) have been mentioned:

numeral 10 denotes a lollipop;
numeral 12 denotes a lollipop sweetmeat;
numeral 14 denotes a lollipop stick;
numeral 16 denotes a lollipop cover;
numeral 18 denotes a knot;
numeral 20 denotes a lollipop cover cutter;
numeral 22 denotes a sickle;
numeral 24 denotes a handle;
numeral 26 denotes a blade;
numeral 28 denotes an area of the stick where it meets with the sweetmeat; and
numeral 30 denotes a section of the blade 26.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

The invention claimed is:

1. A lollipop comprising:
   a hollow stick;
   said hollow stick having a longitudinal axis;
   a sweetmeat (12) mounted on one end of said hollow stick;
   a cover in a form of a sheet folded around both, said sweetmeat and said hollow stick; and
   a lollipop cover cutter, comprising:
   (a) a handle, said handle having a proximal end and a distal end wherein said proximal end is inserted within a hollow part of said hollow stick; and
   (b) a sickle, being a single semi-circular blade, wherein said sickle is connected to said distal end of said handle;
   such that upon locating said cover in said sickle blade and rotating said hollow stick about said longitudinal axis, said cover is cut by said blade.

2. The lollipop according to claim 1, wherein an inner diameter of said blade is greater than an outer diameter of said stick.

3. The lollipop according to claim 1, wherein a section of said blade is greater than 180 degrees, thereby upon placing said stick in an inner side of said blade, locking said stick in said inner side of said blade, thereby obviating a need to apply force of the stick against said blade.

4. The lollipop according to claim 1, wherein said cutter is made of one piece and wherein said cutter is manufactured by casting.

5. The lollipop according to claim 1, wherein said sickle is flexible to allow a diameter of said sickle to increase to accommodate a diameter of said hollow stick.

6. The lollipop according to claim 1, wherein said sickle is made of plastic.

* * * * *